(12) United States Patent
Min et al.

(10) Patent No.: US 10,768,019 B2
(45) Date of Patent: Sep. 8, 2020

(54) ACTUATOR AND CAMERA MODULE INCLUDING SAME

(71) Applicant: SAMSUNG ELECTRO-MECHANICS CO., LTD., Suwon-si (KR)

(72) Inventors: Sang Hyun Min, Suwon-si (KR); Jae Hyung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 145 days.

(21) Appl. No.: 16/006,356

(22) Filed: Jun. 12, 2018

(65) Prior Publication Data

US 2019/0162562 A1   May 30, 2019

(30) Foreign Application Priority Data

Nov. 24, 2017 (KR) .................. 10-2017-0158296

(51) Int. Cl.
| | |
|---|---|
| *G01D 5/20* | (2006.01) |
| *G02B 27/64* | (2006.01) |
| *G03B 5/02* | (2006.01) |
| *G03B 5/04* | (2006.01) |
| *G03B 13/36* | (2006.01) |

(52) U.S. Cl.
CPC ........... *G01D 5/2033* (2013.01); *G02B 27/64* (2013.01); *G03B 5/02* (2013.01); *G03B 5/04* (2013.01); *G03B 13/36* (2013.01); *G03B 2205/0015* (2013.01)

(58) Field of Classification Search
CPC .............. G01D 5/2033; G01D 5/22
USPC ........................................ 396/52
See application file for complete search history.

(56) References Cited

U.S. PATENT DOCUMENTS

| | | | |
|---|---|---|---|
| 6,124,708 A * | 9/2000 | Dames ............... | G01D 5/2053 324/207.12 |
| 10,698,174 B2 * | 6/2020 | Lee .................... | G03B 13/36 |
| 2005/0168584 A1 * | 8/2005 | Uenaka .............. | H04N 5/2254 348/208.99 |
| 2011/0096178 A1 * | 4/2011 | Ryu ................... | H04N 5/2252 348/208.2 |

(Continued)

FOREIGN PATENT DOCUMENTS

| | | |
|---|---|---|
| JP | 4390347 B2 | 12/2009 |
| JP | 2014-92482 A | 5/2014 |

(Continued)

OTHER PUBLICATIONS

Korean Office Action dated May 30, 2019 in corresponding Korean Patent Application No. 10-2017-0158296 (6 pages in English and 5 pages in Korean).

(Continued)

*Primary Examiner* — Christopher E Mahoney
(74) *Attorney, Agent, or Firm* — NSIP Law (57) ABSTRACT

An actuator including a detection target disposed on a surface of a lens barrel, and a position detecting unit including two or more sensing coils and configured to detect a displacement of the detection target in a first direction perpendicular to an optical axis, wherein when the detection target moves in a second direction perpendicular to the optical axis, an area of overlap between each of the two or more sensing coils and the detection target is maintained constant.

20 Claims, 8 Drawing Sheets

(56) References Cited

U.S. PATENT DOCUMENTS

| | | | | |
|---|---|---|---|---|
| 2016/0033786 A1* | 2/2016 | Kim | ............... | G03B 5/02 |
| | | | | 359/557 |
| 2016/0087583 A1* | 3/2016 | Matsumoto | ......... | H05K 1/0215 |
| | | | | 331/116 R |
| 2016/0154249 A1* | 6/2016 | Yeo | ............... | G03B 5/00 |
| | | | | 359/557 |
| 2018/0284568 A1* | 10/2018 | Oh | ............... | G03B 3/10 |
| 2019/0094565 A1* | 3/2019 | Park | ............... | G03B 11/04 |

FOREIGN PATENT DOCUMENTS

| | | |
|---|---|---|
| JP | 2014-224940 A | 12/2014 |
| JP | 2015-124999 A | 7/2015 |
| KR | 10-2013-0077216 A | 7/2013 |
| KR | 10-2017-0105234 A | 9/2017 |

OTHER PUBLICATIONS

Korean Office Action dated Nov. 29, 2019 in counterpart Korean Patent Application No. 10-2017-0158296 (6 pages in English and 5 pages in Korean).

\* cited by examiner

ACTUATOR AND CAMERA MODULE INCLUDING SAME

CROSS-REFERENCE TO RELATED APPLICATIONS

This application claims the benefit under 35 USC 119(a) of Korean Patent Application No. 10-2017-0158296 filed on Nov. 24, 2017 in the Korean Intellectual Property Office, the entire disclosure of which is incorporated herein by reference for all purposes.

BACKGROUND

1. Field

This application relates to an actuator and a camera module including an actuator.

2. Description of the Background

Recently, portable communications terminals such as cellular phones, personal digital assistants (PDAs), portable personal computers (PCs), and the like, have generally been implemented with the ability to perform the transmission of video data as well as the transmission of text or audio data. In accordance with such a trend, camera modules have recently become standard in portable communications terminals to enable the transmission of video data, allow for video chatting, and the like.

Generally, a camera module includes a lens barrel having lenses disposed therein, a housing to accommodate the lens barrel therein, and an image sensor to convert an image of a subject into an electrical signal. A single focus type camera module to capture an image of a subject at a fixed focus may be used as the camera module. However, recently, in accordance with the development of technology, a camera module including an actuator that enables autofocusing (AF) has been used. In addition, a camera module may include an actuator for optical image stabilization (OIS) in order to suppress a resolution decrease phenomenon due to handshake.

The above information is presented as background information only to assist with an understanding of the present disclosure. No determination has been made, and no assertion is made, as to whether any of the above might be applicable as prior art with regard to the disclosure.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator includes a detection target disposed on a surface of a lens barrel, and a position detecting unit including two or more sensing coils and is configured to detect a displacement of the detection target in a first direction perpendicular to an optical axis. When the detection target moves in a second direction perpendicular to the optical axis, an area of overlap between each of the two or more sensing coils and the detection target is maintained constant.

The first direction may correspond to a direction perpendicular to a surface on which the two or more sensing coils are disposed.

The second direction may correspond to a direction parallel with a surface on which the two or more sensing coils are disposed.

The two or more sensing coils may include a main-sensing coil and a sub-sensing coil.

An inductance of the main-sensing coil may be greater than that of the sub-sensing coil.

The main-sensing coil and the sub-sensing coil may be disposed to face the detection target.

A range in which the detection target is movable in the second direction may be positioned to overlap in a hollow portion of the main-sensing coil, and the sub-sensing coil may be disposed inside the hollow portion of the main-sensing coil.

The main-sensing coil may be disposed to face the detection target, and the sub-sensing coil may be disposed outside a range in which the detection target is movable in the second direction.

A range in which the detection target is movable in the second direction may be positioned to overlap in a hollow portion of the main-sensing coil, and the sub-sensing coil may be disposed outside of the hollow portion of the main-sensing coil.

In another general aspect, an actuator includes a detection target disposed on a surface of a lens barrel, an oscillating unit including two or more oscillation circuits, each of the two or more oscillation circuits includes a sensing coil, and a detecting unit configured to calculate a position of the detection target in a first direction perpendicular to an optical axis in response to a difference between frequencies of two or more oscillation signals output from the two or more oscillation circuits, respectively. When the detection target moves in a second direction perpendicular to the optical axis, the frequencies of the two or more oscillation signals are maintained constant.

The two or more sensing coils may include a main-sensing coil and a sub-sensing coil, and when the detection target moves in the second direction, an area of overlap between each of the main-sensing coil and the sub-sensing coil and the detection target may be maintained constant.

An inductance of the main-sensing coil may be greater than that of the sub-sensing coil.

The main-sensing coil and the sub-sensing coil may be disposed to face the detection target.

A range in which the detection target is movable in the second direction may be positioned to overlap in a hollow portion of the main-sensing coil, and the sub-sensing coil may be disposed inside the hollow portion of the main-sensing coil.

The main-sensing coil may be disposed to face the detection target, and the sub-sensing coil may be disposed outside a range in which the detection target is movable in the second direction.

A range in which the detection target is movable in the second direction may be positioned to overlap in a hollow portion of the main-sensing coil, and the sub-sensing coil may be disposed outside of the hollow portion of the main-sensing coil.

In another general aspect, an actuator includes a first detection target disposed on a lateral surface of a body and a second detection target disposed on another surface of the body, and a detecting unit including two or more first sensing coils configured to detect a displacement of the first detection target perpendicular to the lateral surface and two or more second sensing coils configured to detect a displacement of the second detection target perpendicular to the other surface. Overlap area of the first detection target with the first sensing coils remains constant when the body moves perpendicular to the lateral surface and overlap area of the second detection target with the second sensing coils remains constant when the body moves perpendicular to the other surface.

The body may include a lens barrel including an optical axis parallel to the lateral surface and the other surface.

The two or more first sensing coils may include coils of different inductances. The two or more second sensing coils may include coils of different inductances.

The actuator may further include a computing unit configured to receive oscillation signals from circuits including the first and second sensing coils, and to output a frequency corresponding to each received signal. The detecting unit may be further configured to calculate a position of the body in a direction perpendicular to the lateral surface in response to a difference between frequencies corresponding to the two or more first sensing coils, and in a direction perpendicular to the other surface in response to a difference between frequencies corresponding to the two or more second sensing coils.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

An aspect of the present disclosure provides an actuator of a camera module capable of precisely detecting a position of a magnet without using a hall sensor.

Figure 1:
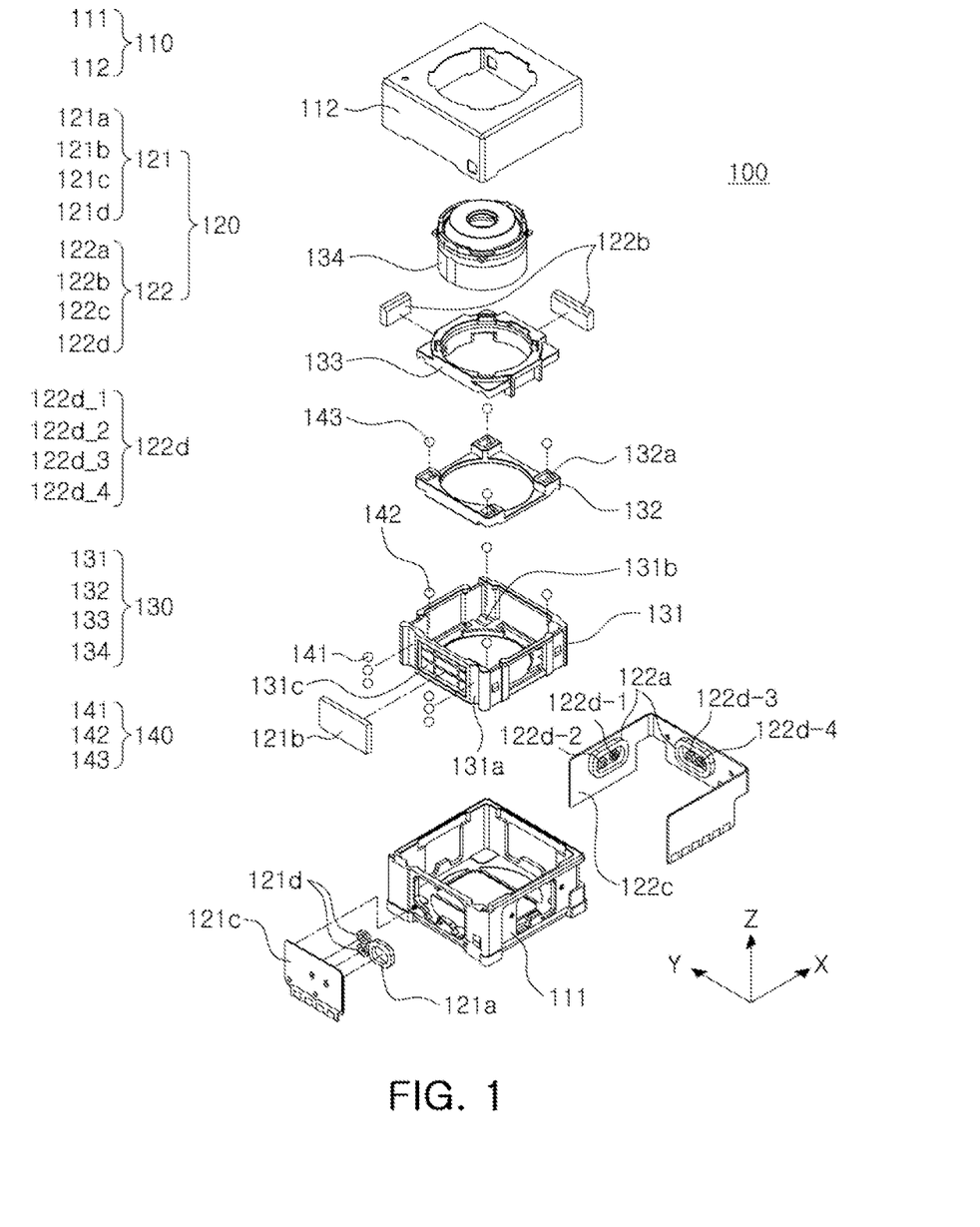
FIG. 1 is an exploded perspective view illustrating an example of a camera module.

FIG. 1 is an exploded perspective view illustrating an example of a camera module.

Referring to FIG. 1, a camera module 100 according to examples disclosed herein includes a housing unit 110, an actuator 120, a lens module 130, and a ball bearing portion 140.

The camera module 100 is configured to perform one or more of an autofocusing function and an optical image stabilization function. As an example, in order for the camera module 100 to perform the autofocusing function and the optical image stabilization function, the lens module 130 moves in an optical axis direction (Z-axis direction) and directions (X-axis and Y-axis directions) perpendicular to an optical axis in the housing unit 110.

The housing unit 110 includes a housing 111 and a shield case 112. The housing 111 may be formed of a material that is easily molded. For example, the housing 111 may be formed of plastic. One or more actuator 120 is mounted in the housing 111. As an example, some of components of a first actuator 121 are mounted on a first side surface of the housing 111, and some of components of a second actuator 122 are mounted on second and third side surfaces of the housing 111. The housing 111 is configured to accommodate the lens module 130 therein. As an example, a space in which the lens module 130 may be completely or partially accommodated is formed in the housing 111.

Six surfaces of the housing 111 are open. As an example, a hole for an image sensor is formed in a bottom surface of the housing 111, and a rectangular hole for mounting the lens module 130 is formed in a top surface of the housing 111. In addition, the first side surface of the housing 111 is open so that a first driving coil 121a of the first actuator 121 may be inserted thereinto, and the second and third side surfaces of the housing 111 are open so that second diving coils 122a of the second actuator 122 may be inserted thereinto.

The shield case 112 is configured to cover portions of the housing 111. As an example, the shield case 112 is configured to cover the top surface and four side surfaces of the housing 111. Alternatively, the shield case 112 may be configured to cover only the four side surfaces of the housing 111 or may be configured to partially cover the top surface and the four side surfaces of the housing 111. The shield case 112 blocks electromagnetic waves generated during driving of the camera module. The electromagnetic waves may be generated at the time of driving the camera module, and when the electromagnetic waves are emitted externally of the camera module, the electromagnetic waves may affect other electronic components to cause communications errors or malfunctions. In order to prevent such a problem, the shield case 112 may be formed of a metal and may be grounded to a ground pad of a substrate mounted on the bottom surface of the housing 111 to block the electromagnetic waves. Meanwhile, when the shield case 112 is formed of a plastic injection-molded product, a conductive paint may be applied to an inner surface of the shield case 112 or a conductive film or a conductive tape may be attached to the inner surface of the shield case 112 to block the electromagnetic waves. In this case, the conductive paint may be conductive epoxy, but is not limited thereto. That is, various materials having conductivity may be used as the conductive paint.

The number of actuators 120 may be plural. As an example, the actuators 120 include the first actuator 121 configured to move the lens module 130 in a Z-axis direction and the second actuator 122 configured to move the lens module 130 in an X-axis direction and a Y-axis direction.

The first actuator 121 is mounted on the housing 111 and a first frame 131 of the lens module 130. As an example, some of the components of the first actuator 121 are mounted on the first side surface of the housing 111, and other components of the first actuator 121 are mounted on a first side surface of the first frame 131. The first actuator 121 moves the lens module 130 in the Z-axis direction. As an example, the first actuator 121 includes the first driving coil 121a, a first magnet 121b, a first substrate 121c, and one or more autofocusing (AF) sensing coil 121d. The first driving coil 121a and the AF sensing coil 121d are formed on the first substrate 121c. The first substrate 121c is mounted on the first side surface of the housing 111, and the first magnet 121b is mounted on the first side surface 131c of the first frame 131 facing the first substrate 121c.

A first driving device (not illustrated) configured to provide a driving signal to the first driving coil 121a may be provided on the first substrate 121c. The first driving device applies the driving signal to the first driving coil 121a to provide driving force to the first magnet 121b. The first driving device may include a driver integrated circuit (IC) to provide the driving signal to the first driving coil 121a. When the driving signal is applied from the first driving device to the first driving coil 121a, a magnetic flux is generated by the first driving coil 121a, and interacts with a magnetic field of the first magnet 121b to generate driving force enabling relative movement of the first frame 131 and a lens barrel 134 with respect to the housing 111, depending on Fleming's left-hand rule. The first driving device may include an H-bridge circuit that is bidirectionally driven to apply the driving signal to the first driving coil 121a.

The lens barrel 134 moves in the same direction as a moving direction of the first frame 131 by movement of the first frame 131. The first actuator 121 senses strength of the magnetic field by the first magnet 121b by the AF sensing coil 121d to detect positions of the first frame 131 and the lens barrel 134.

The AF sensing coil 121d is disposed outside of the first driving coil 121a, and includes one or more coil. An inductance of the AF sensing coil 121d is changed in response to a displacement of the first magnet 121b. When the first magnet 121b moves in one direction, the strength of the magnetic field of the first magnet 121b having an influence on the AF sensing coil 121d is changed, and the inductance of the AF sensing coil 121d is thus changed. The first actuator 121 determines displacements of the lens barrel 134 and the first frame 131 from the change in the inductance of one or more AF sensing coil 121d. As an example, the first actuator 121 further includes one or more capacitor, and the one or more capacitor and the AF sensing coil 121d may form a predetermined oscillation circuit. As an example, the number of capacitors included in the first actuator 121 corresponds to that of AF sensing coils 121d, and one capacitor and one AF sensing coil 121d are configured in a form such as a predetermined LC oscillator or in a form such as any well-known Colpitts oscillator.

The first actuator 121 determines the displacement of the lens barrel 134 from a change in a frequency of an oscillation signal generated by the oscillation circuit. In detail, when the inductance of the AF sensing coil 121d forming the oscillation circuit is changed, the frequency of the oscillation signal generated by the oscillation circuit is changed, and the displacement of the lens barrel 134 is thus detected on the basis of the change in the frequency.

The second actuator 122 is mounted on the housing 111 and a third frame 133 of the lens module 130. As an example, some of the components of the second actuator 122 are mounted on the second and third side surfaces of the housing 111, and other components of the second actuator 122 are mounted on second and third side surfaces of the third frame 133. Meanwhile, in another example, the second actuator 122 is mounted on all of the second, third, and fourth side surfaces of the housing 111 and the third frame 133, or on corners at which the second, third, and fourth side surfaces are in contact with each other.

The second actuator 122 moves the lens module 130 in the X-axis direction and the Y-axis direction. As an example, the second actuator 122 includes second driving coils 122a, second magnets 122b, a second substrate 122c, and optical image stabilization (OIS) sensing coils 122d, for example, first, second, third, and fourth OIS sensing coils 122d_1, 122d_2, 122d_3, and 122d_4.

The second driving coils 122a and the OIS sensing coils 122d_1, 122d_2, 122d_3, and 122d_4 are formed on the second substrate 122c. As an example, the number of second driving coils 122a is two, and the two second driving coils 122a are disposed on second and third side surfaces of the second substrate 122c, respectively. In addition, the number of OIS sensing coils 122d_1, 122d_2, 122d_3, and 122d_4 is four, and two OIS sensing coils 122d_1 and 122d_2 are disposed on the second side surface of the second substrate 122c, and the other two OIS sensing coils 122d_3 and 122d_4 are disposed on the third side surface of the second substrate 122c. The two OIS sensing coils 122d_1 and 122d_2 detect movement of the lens barrel 134 in the Y-axis direction, and the other two OIS sensing coils 122d_3 and 122d_4 detect movement of the lens barrel 134 in the X-axis direction.

The second substrate 122c has a generally rectangular shape of which one or more side is open, and is mounted to surround the second, third, and fourth side surfaces of the housing 111. The second magnets 122b are mounted on the second and third side surfaces of the third frame 133, respectively, to face the second driving coils 122a disposed on the second substrate 122c.

A second driving device (not illustrated) configured to provide driving signals to the second driving coils 122a may be provided on the second substrate 122c. The second driving device applies the driving signals to the second driving coils 122a to provide driving force to the second magnets 122b. The second driving device may include a driver IC to provide the driving signals to the second driving coils 122a. In detail, when the driving signals are provided from the second driving device to the second driving coils 122a, magnetic fluxes are generated by the second driving coils 122a, and interact with magnetic fields of the second magnets 122b. The second driving device changes a magnitude and a direction of magnetic force generated between the second driving coils 122a and the second magnets 122b to enable relative movement of a second frame 132 or the third frame 133 with respect to the first frame 131. The second driving device may include an H-bridge circuit that is bidirectionally driven to apply the driving signals to the second driving coils 122a.

The lens barrel 134 moves in the same direction as a moving direction of the second frame 132 or the third frame 133 by the movement of the second frame 132 or the third frame 133. The second actuator 122 senses strength of the magnetic fields of the second magnets 122b with the OIS sensing coils 122d_1, 122d_2, 122d_3, and 122d_4 to detect positions of the lens barrel 134 and the second or third frame 132 or 133. The second actuator 122 detects the position of the second frame 132 or the third frame 133 from changes in inductances of the OIS sensing coils 122d_1, 122d_2, 122d_3, and 122d_4.

The lens module 130 is mounted in the housing unit 110. As an example, the lens module 130 is accommodated in an accommodation space formed by the housing 111 and the shield case 112 to be movable in at least three axis directions. The lens module 130 includes a plurality of frames. As an example, the lens module 130 includes the first frame 131, the second frame 132, and the third frame 133.

The first frame 131 is configured to be movable with respect to the housing 111. As an example, the first frame 131 moves in the Z-axis direction of the housing 111 by the first actuator 121 described above. Guide grooves 131a and 131b are formed in the first frame 131. As an example, a first guide groove 131a extended to be elongated in the Z-axis direction is formed in the first side surface of the first frame 131, and second guide grooves 131b extended to be elongated in the Y-axis direction is formed in four corners of an inner bottom surface of the first frame 131, respectively. The first frame 131 is manufactured so that three or more side surfaces thereof are open. As an example, second and third side surfaces of the first frame 131 are open so that the second magnets 122b mounted on the third frame 133 and the second driving coils 122a mounted on the second substrate 122c disposed on the housing 111 may face each other.

The second frame 132 is mounted in the first frame 131. As an example, the second frame 132 is mounted in an internal space of the first frame 131. The second frame 132 is configured to move in the Y-axis direction with respect to the first frame 131. As an example, the second frame 132 moves in the Y-axis direction along the second guide grooves 131b of the first frame 131.

Guide grooves 132a are formed in the second frame 132. As an example, four third guide grooves 132a extended to be elongated in the X-axis direction are formed in corners of the second frame 132, respectively. The third frame 133 is mounted on the second frame 132. The third frame 133 is mounted on an upper surface of the second frame 132. The third frame 133 is configured to move in the X-axis direction, perpendicular to the optical axis with respect to the second frame 132. As an example, the third frame 133 moves in the X-axis direction along the third guide grooves 132a of the second frame 132. The second magnets 122b are mounted on the third frame 133. As an example, two second magnets 122b are mounted on the second and third side surfaces of the third frame 133, respectively. Meanwhile, in another example, the third frame 133 described above is formed integrally with the second frame 132. In this case, the third frame 133 is omitted, and the second frame 132 moves in the X-axis direction and the Y-axis direction.

The lens module 130 includes the lens barrel 134. As an example, the lens module 130 includes the lens barrel 134 including one or more lenses. The lens barrel 134 may have a hollow cylindrical shape so that one or more lens, to capture an image of a subject, is accommodated therein, and the one or more lens is provided in the lens barrel 134 along the optical axis. The number of lenses stacked in the lens barrel 134 depends on a selected design of the lens barrel 134, and these lenses have optical characteristics such as the same refractive index or different refractive indices, or the like.

The lens barrel 134 is mounted in the third frame 133. As an example, the lens barrel 134 is fitted into the third frame 133 to thus move integrally with the third frame 133. The lens barrel 134 is configured to move in the Z-axis direction, the X-axis direction, and the Y-axis direction. As an example, the lens barrel 134 moves in the Z-axis direction by the first actuator 121, and moves in the X-axis and Y-axis directions by the second actuator 122.

The ball bearing portion 140 guides the movement of the lens module 130. As an example, the ball bearing portion 140 is configured so that the lens module 130 moves smoothly in the optical axis direction and the directions perpendicular to the optical axis. The ball bearing portion 140 includes first ball bearings 141, second ball bearings 142, and third ball bearings 143. As an example, the first ball bearings 141 are disposed in the first guide groove 131a of the first frame 131 to allow the first frame 131 to move smoothly in the optical axis direction. As another example, the second ball bearings 142 are disposed in the second guide grooves 131b of the first frame 131 to allow the second frame 132 to move smoothly in the first direction, perpendicular to the optical axis. As another example, the third ball bearings 143 are disposed in the third guide grooves 132a of the second frame 132 to allow the third frame 133 to move smoothly in the second direction, perpendicular to the optical axis.

Each of the first and second ball bearings 141 and 142 may include three or more bearings, and the three or more bearings of each of the first and second ball bearings 141 and 142 are disposed in the first or second guide grooves 131a or 131b, respectively.

A lubricating material for reducing friction and noise may be filled in all portions in which the ball bearing portion 140 is disposed. As an example, a viscous fluid is injected into the respective guide grooves 131a, 131b, and 132a. As the viscous fluid, grease having excellent viscosity and lubricating characteristics may be used.

Figure 2:
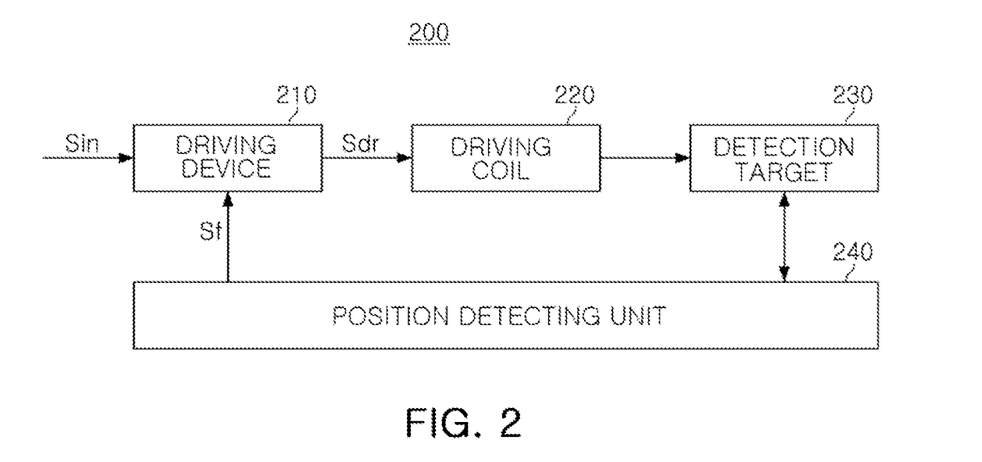
FIG. 2 is a block diagram illustrating example main units of an actuator used in the camera module of FIG. 1.

FIG. 2 is a block diagram illustrating example main units of an actuator used in the camera module in the examples disclosed herein. An actuator 200 in the example of FIG. 2 may correspond to the second actuator 122 of FIG. 1.

When the actuator 200 of FIG. 2 corresponds to the second actuator 122 of FIG. 1, the actuator 200 moves the lens barrel in the directions perpendicular to the optical axis in order to perform an OIS function of the camera module. Therefore, when the actuator 200 of FIG. 2 performs the optical image stabilization function, a driving device 210 applies a driving signal to a driving coil 220 to provide driving force in the directions perpendicular to the optical axis to a magnet.

The actuator 200 in the present example includes the driving device 210, the driving coil 220, a detection target 230, and a position detecting unit 240.

The driving device 210 generates a driving signal Sdr in response to an input signal Sin applied from an external source and a feedback signal Sf generated by the position detecting unit 240, and provides the generated driving signal Sdr to the driving coil 220. When the driving signal Sdr is applied to the driving coil 220 from the driving device 210, the lens barrel moves in the directions perpendicular to the optical axis by electromagnetic interaction between the driving coil 220 and the magnet.

The position detecting unit 240 is configured to calculate a position of the lens barrel moving by the electromagnetic interaction between the magnet and the driving coil 220 through the detection target 230 to generate the feedback signal Sf, and provide the feedback signal Sf to the driving device 210. The detection target 230 is provided at one side of the lens barrel to move in the same direction as a moving direction of the lens barrel. As an example, the detection target 230 is provided on each of one surface and the other surface of the lens barrel and faces sensing coils of the position detecting unit 240. For example, the detection target 230 includes a first detection target disposed on the one surface and a second detection target disposed on the other surface of the lens barrel. In another example, the detection target 230 is provided on frames coupled to the lens barrel, in addition to the lens barrel. Here, one surface and the other surface of the lens barrel refer to surfaces of the lens barrel each orthogonal to two directions perpendicular to the optical axis direction.

The detection target 230 may be formed of one or more of a magnetic material and a conductor. As an example, the detection target 230 corresponds to the second magnets 122b included in the second actuator 122 of FIG. 1. However, in another example, the detection target 230 is configured using a separate element, in addition to the second magnets 122b.

The position detecting unit 240 includes sensing coils, and is configured to calculate a position of the lens barrel in response to inductances of the sensing coils. When the detection target 230 provided at one side of the lens barrel moves, distances between the sensing coils and the detection target are changed, and the position detecting unit 240 thus calculates positions of the lens barrel in the X-axis and Y-axis directions in response to inductances of the sensing coils changed in response to the movement of the detection target 230. In this case, the sensing coils included in the position detecting unit 240 may correspond to the OIS sensing coils 122d_1, 122d_2, 122d_3, and 122d_4 included in the second actuator 122 of FIG. 1.

Figure 3:
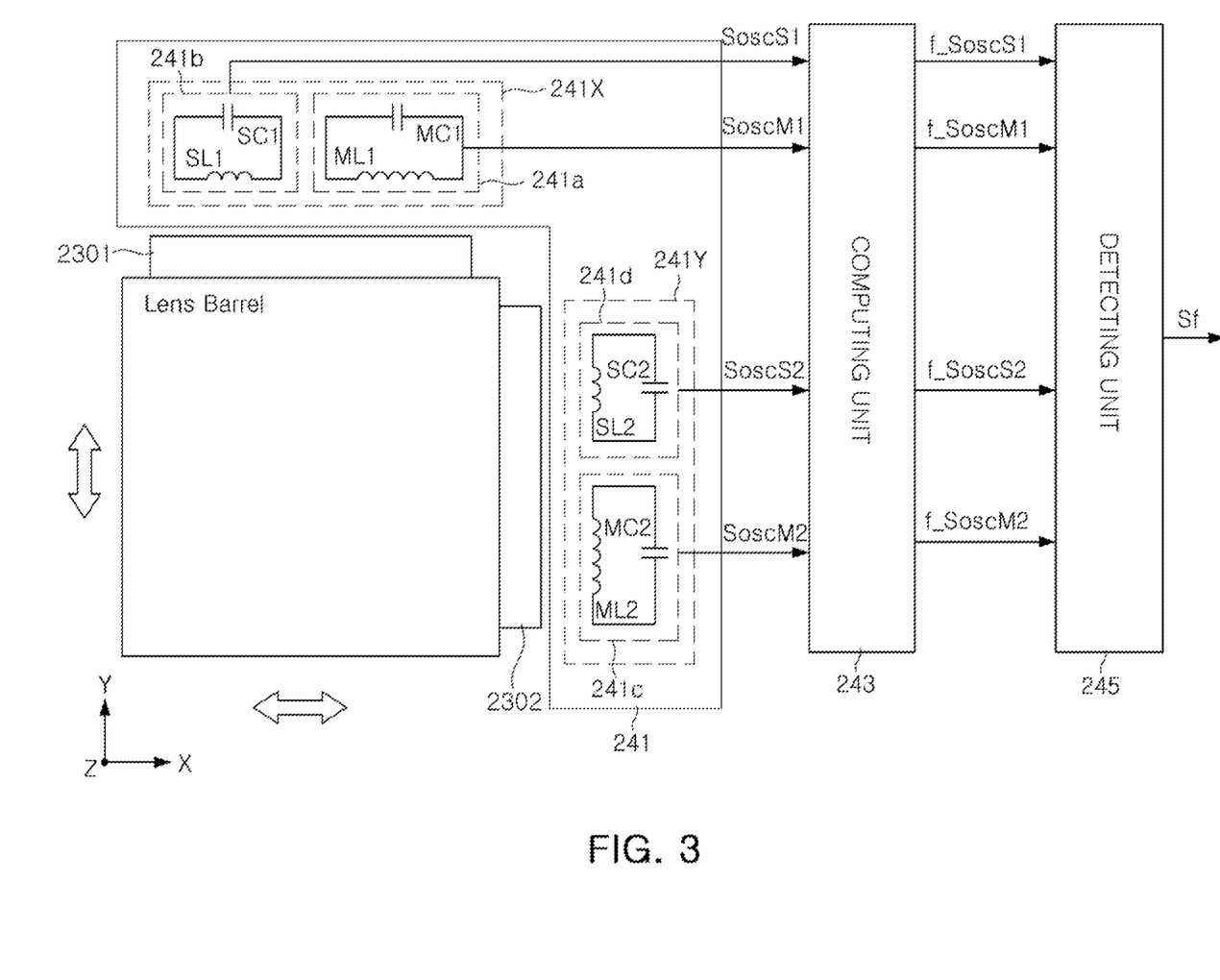
FIG. 3 is a block diagram illustrating an example position detecting unit.

FIG. 3 is a block diagram illustrating an example position detecting unit. An operation of calculating the position of the lens barrel by the position detecting unit 240 will hereinafter be described with reference to FIGS. 1 through 3.

The position detecting unit 240 in the example includes an oscillating unit 241, a computing unit 243, and a detecting unit 245.

The oscillation unit 241 includes a first oscillation circuit unit 241X and a second oscillation circuit unit 241Y to generate oscillation signals Sosc. Each of the first oscillation circuit unit 241X and the second oscillation circuit unit 241Y includes two or more oscillation circuits. The first oscillation circuit unit 241X is disposed to face one surface of the lens barrel, and the second oscillation circuit unit 241Y is disposed to face the other surface of the lens barrel. Here, one surface and the other surface of the lens barrel refer to surfaces of the lens barrel each orthogonal to two directions perpendicular to the optical axis direction.

The first oscillation circuit unit 241X includes a first main-oscillation circuit 241a and a first sub-oscillation circuit 241b, and the second oscillation circuit unit 241Y includes a second main-oscillation circuit 241c and a second sub-oscillation circuit 241d.

Each of the first main-oscillation circuit 241a, the first sub-oscillation circuit 241b, the second main-oscillation circuit 241c, and the second sub-oscillation circuit 241d includes a sensing coil and a capacitor to constitute a predetermined LC oscillator. In detail, the first main-oscillation circuit 241a includes a first main-sensing coil ML1 and a first main-capacitor MC1, the first sub-oscillation circuit 241b includes a first sub-sensing coil SL1 and a first sub-capacitor SC1, the second main-oscillation circuit 241c includes a second main-sensing coil ML2 and a second main-capacitor MC2, and the second sub-oscillation circuit 241d includes a second sub-sensing coil SL2 and a second sub-capacitor SC2.

The first main-sensing coil ML1, the first sub-sensing coil SL1, the second main-sensing coil ML2, and the second sub-sensing coil SL2 included in the first main-oscillation circuit 241a, the first sub-oscillation circuit 241b, the second main-oscillation circuit 241c, and the second sub-oscillation circuit 241d, respectively, may correspond to the OIS sensing coils 122d_1, 122d_2, 122d_3, and 122d_4 included in the second actuator 122 of FIG. 1. As an example, the first main-sensing coil ML1 and the first sub-sensing coil SL1 correspond to the two OIS sensing coils 122d_1 and 122d_2 disposed on the second side surface of the second substrate 122c, and the second main-sensing coil ML2 and the second sub-sensing coil SL2 may correspond to the other two OIS sensing coils 122d_3 and 122d_4 disposed on the third side surface of the second substrate 122c.

The first main-sensing coil ML1 and the first sub-sensing coil SL1 are disposed to face one surface of the lens barrel, and the second main-sensing coil ML2 and the second sub-sensing coil SL2 are disposed to face the other surface of the lens barrel.

The first main-sensing coil ML1 is provided in order to detect a position of the lens barrel in the Y-axis direction, and the first sub-sensing coil SL1 is provided to remove common noise due to a temperature, or the like. Inductances of both of the first main-sensing coil ML1 and the first sub-sensing coil SL1 are changed in response to movement of the lens barrel in the Y-axis direction, but a change in the inductance of the first sub-sensing coil SL1 from the movement of the lens barrel in the Y-axis direction needs to be limited as much as possible. Therefore, as an example, a diameter of the first sub-sensing coil SL1 is ⅕ to 1/20 of a diameter of the first main-sensing coil ML1. Therefore, an inductance of the first sub-sensing coil SL1 is ⅕ to 1/20 of an inductance of the first main-sensing coil ML1. In addition, as another example, the first sub-sensing coil SL1 does not overlap the detection target.

In order to remove the common noise, a frequency generated by the first sub-sensing coil SL1 is subtracted from a frequency generated by the first main-sensing coil ML1.

In addition, the second main-sensing coil ML2 is provided in order to detect a position of the lens barrel in the X-axis direction, and the second sub-sensing coil SL2 is provided to remove common noise due to a temperature, or the like. Inductances of both of the second main-sensing coil ML2 and the second sub-sensing coil SL2 are changed in response to movement of the lens barrel in the X-axis direction, but a change in the inductance of the second sub-sensing coil SL2 from the movement of the lens barrel in the X-axis direction needs to be limited as much as possible. Therefore, as an example, a diameter of the second sub-sensing coil SL2 is ⅕ to 1/20 of a diameter of the second main-sensing coil ML2. Therefore, an inductance of the second sub-sensing coil SL2 is ⅕ to 1/20 of an inductance of the second main-sensing coil ML2. In addition, as another example, the second sub-sensing coil SL2 does not overlap the detection target.

In order to remove the common noise, a frequency generated by the second sub-sensing coil SL2 is subtracted from a frequency generated by the second main-sensing coil ML2.

The first main-oscillation circuit 241a, the first sub-oscillation circuit 241b, the second main-oscillation circuit 241c, and the second sub-oscillation circuit 241d of FIG. 3, which are schematically illustrated, may be configured in a form of various types of well-known oscillators.

Frequencies of the oscillation signals Sosc of the first main-oscillation circuit 241a, the first sub-oscillation circuit 241b, the second main-oscillation circuit 241c, and the second sub-oscillation circuit 241 are determined by the inductances of the first main-sensing coil ML1, the first sub-sensing coil SL1, the second main-sensing coil ML2, and the second sub-sensing coil SL2.

When the oscillation circuit is implemented by the LC oscillator including the sensing coil and the capacitor, the frequency "f" of the oscillation signal Sosc may be represented by Equation 1. In Equation 1, "l" indicates the respective inductance of the first main-sensing coil ML1, the first sub-sensing coil SL1, the second main-sensing coil ML2, and the second sub-sensing coil SL2, and "c" indicates the respective capacitance of the first main-capacitor MC1, the first sub-capacitor SC1, the second main-capacitor MC2, and the second sub-capacitor SC2.

$$f = \frac{1}{2\pi\sqrt{lc}} \qquad \text{Equation 1}$$

When the lens barrel moves, strength of a magnetic field of a first detection target 2301 having an influence on the inductances of the first main-sensing coil ML1 and the first sub-sensing coil SL1 is changed and strength of a magnetic field of a second detection target 2302 having an influence on the inductances of the second main-sensing coil ML2, and the second sub-sensing coil SL2 is changed. The inductances of the first main-sensing coil ML1, the first sub-sensing coil SL1, the second main-sensing coil ML2, and the second sub-sensing coil SL2 are thus changed. Therefore, frequencies of a first main-oscillation signal SoscM1, a first sub-oscillation signal SoscS1, a second main-oscillation signal SoscM2, and a second sub-oscillation signal SoscS2 respectively output from the first main-oscillation circuit 241a, the first sub-oscillation circuit 241b, the second main-oscillation circuit 241c, and the second sub-oscillation circuit 241d are changed in response to movement of the detection targets 2301 and 2302. In the present example, a magnetic material having a high magnetic permeability may be disposed between the first and second detection targets 2301 and 2302 and the first and second main-oscillation circuits 241a and 241c, respectively, in order to raise change ratios in the inductances of the first main-sensing coil ML1 and the second main-sensing coil ML2 in response to the movement of the detection targets 2301 and 2302.

The inductances of the first main-sensing coil ML1 and the first sub-sensing coil SL1 are changed from the movement of the lens barrel in the Y-axis direction. Meanwhile, in order to limit the changes in the inductances of the first main-sensing coil ML1 and the first sub-sensing coil SL1 due to the movement of the lens barrel in the X-axis direction, when the lens barrel moves in the X-axis direction, areas of overlap between the first detection target 2301, and the first main-sensing coil ML1 and the first sub-sensing coil SL1 are maintained constant. Therefore, when the lens barrel moves in the X-axis direction, the frequencies of the first main-oscillation signal SoscM1 and the first sub-oscillation signal SoscS1 are maintained constant.

Likewise, the inductances of the second main-sensing coil ML2 and the second sub-sensing coil SL2 are changed from the movement of the lens barrel in the X-axis direction. Meanwhile, in order to limit the changes in the inductances of the second main-sensing coil ML2 and the second sub-sensing coil SL2 due to the movement of the lens barrel in the Y-axis direction, when the lens barrel moves in the Y-axis direction, areas of overlap between the second detection target 2302, and the second main-sensing coil ML2 and the second sub-sensing coil SL2 are maintained constant. Therefore, when the lens barrel moves in the Y-axis direction, the frequencies of the second main-oscillation signal SoscM2 and the second sub-oscillation signal SoscS2 are maintained constant.

FIGS. 4 through 7 are views illustrating dispositions of sensing coils and detection targets according to various examples. Referring to FIGS. 4 through 7, examples of the first main-sensing coil ML1, the first sub-sensing coil SL1, and the first detection target 2301 are illustrated, but the illustration and example description provided below may also be applied to the second main-sensing coil ML2, the second sub-sensing coil SL2, and the second detection target 2302. In FIGS. 4 through 7, X1 and X2 indicate ranges in which the first detection target 2301 is movable in the X-axis direction.

Figure 4:
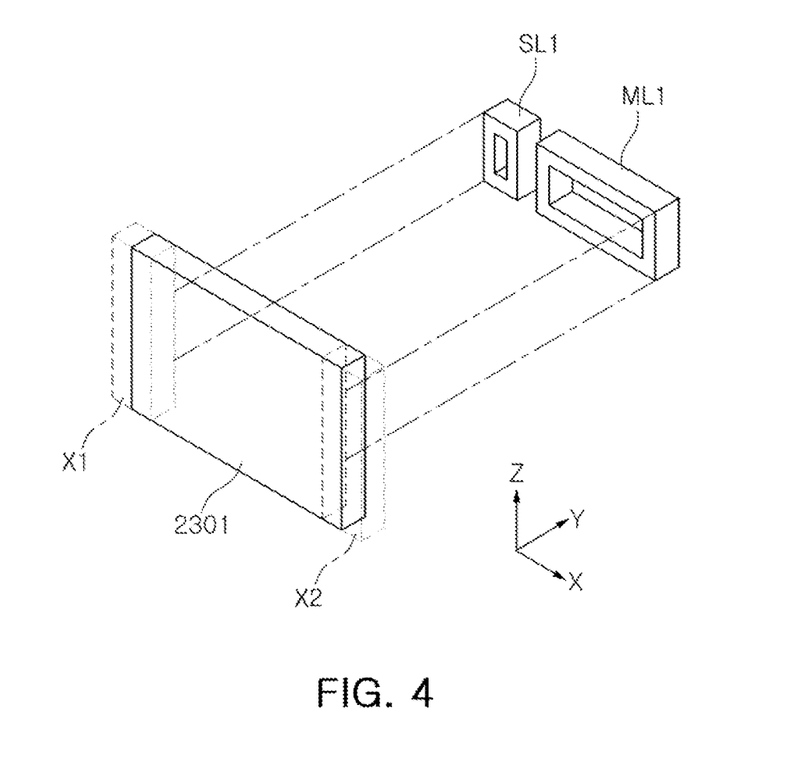
FIGS. 4 through 7 are views illustrating dispositions of sensing coils and detection targets according to various examples.

Referring to FIG. 4, entire areas of the first main-sensing coil ML1 and the first sub-sensing coil SL1 overlap the first detection target 2301. Here, in order to limit the inductance of the first sub-sensing coil SL1 provided in order to remove the common noise due to the temperature, or the like, from the movement of the first detection target 2301 in the Y-axis direction, the first sub-sensing coil SL1 is manufactured to have an inductance corresponding to ⅕ to ¹⁄₂₀ of the inductance of the first main-sensing coil ML1. In the present example, the first main-sensing coil ML1 and the first sub-sensing coil SL1 are disposed in a hollow portion of a driving coil.

Figure 5:
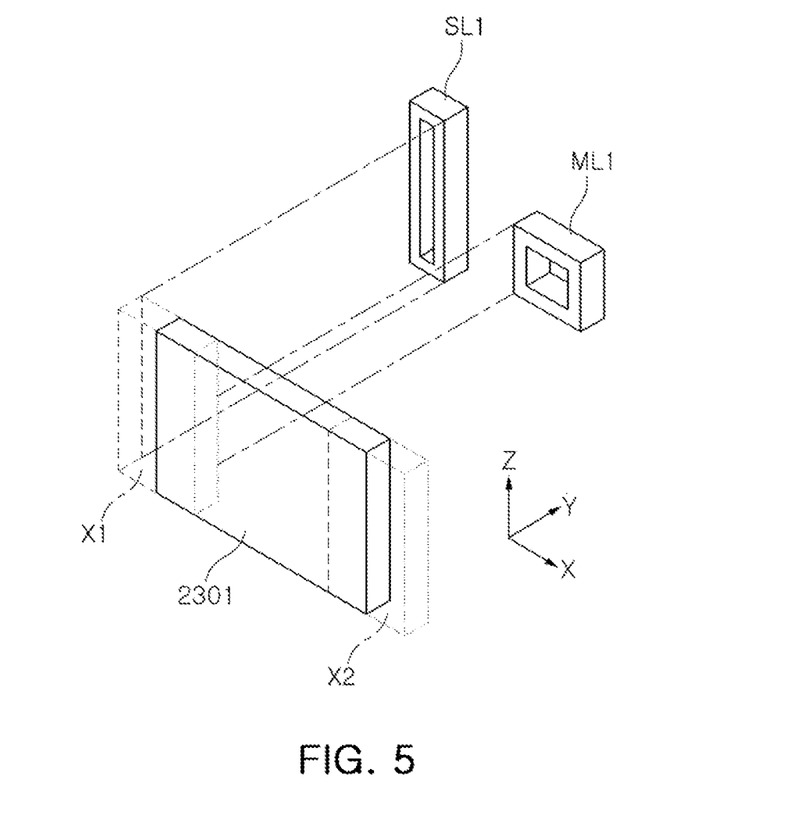

Referring to FIG. 5, an entire area of the first main-sensing coil ML1 overlaps the first detection target 2301, and the first sub-sensing coil SL1 does not overlap the first detection target 2301. Therefore, the inductance of the first sub-sensing coil SL1 provided in order to remove the common noise due to the temperature, or the like, is limited from the movement of the first detection target 2301 in the Y-axis direction. In the present example, the first main-sensing coil ML1 is disposed in a hollow portion of a driving coil, and the first sub-sensing coil SL1 is disposed outside of the driving coil.

Figure 6:
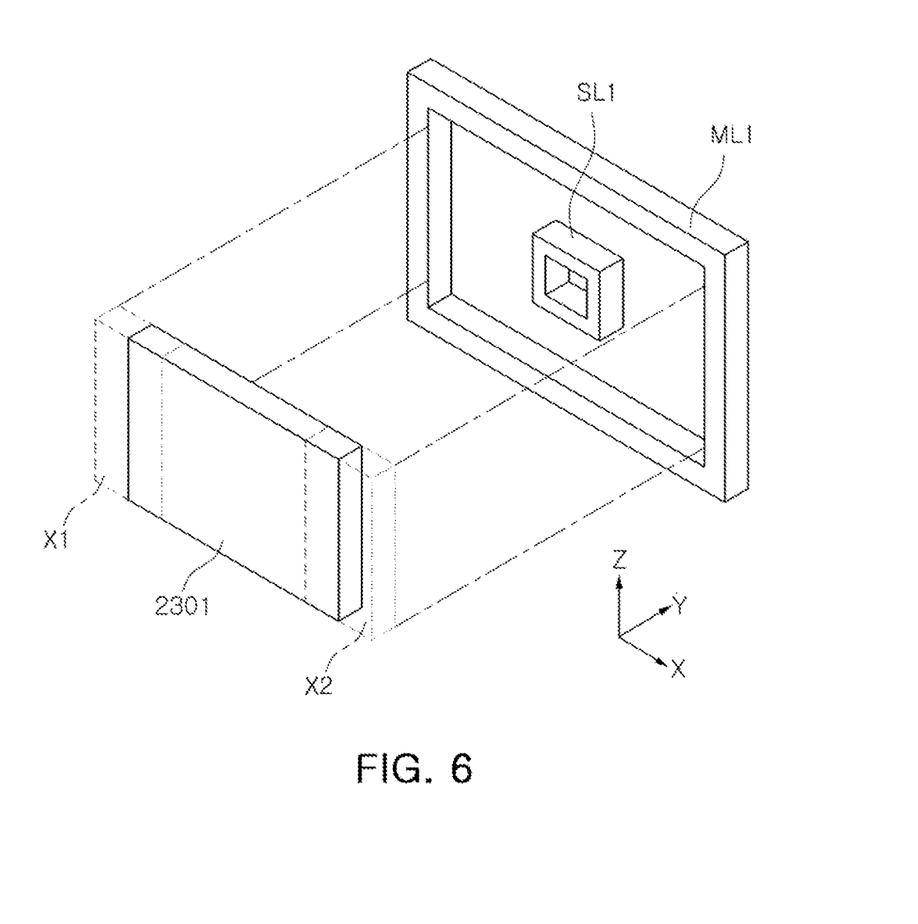

Referring to FIG. 6, the first main-sensing coil ML1 does not overlap the first detection target 2301, and an entire area of the first sub-sensing coil SL1 overlaps the first detection target 2301. Here, in order to limit the inductance of the first sub-sensing coil SL1 provided in order to remove the common noise due to the temperature, or the like, from the movement of the first detection target 2301 in the Y-axis direction, the first sub-sensing coil SL1 is manufactured to have an inductance corresponding to ⅕ to ¹⁄₂₀ of the inductance of the first main-sensing coil ML1. In the present example, a driving coil is disposed in a hollow portion of the first main-sensing coil ML1, and the first sub-sensing coil SL1 is disposed in a hollow portion of the driving coil.

Figure 7:
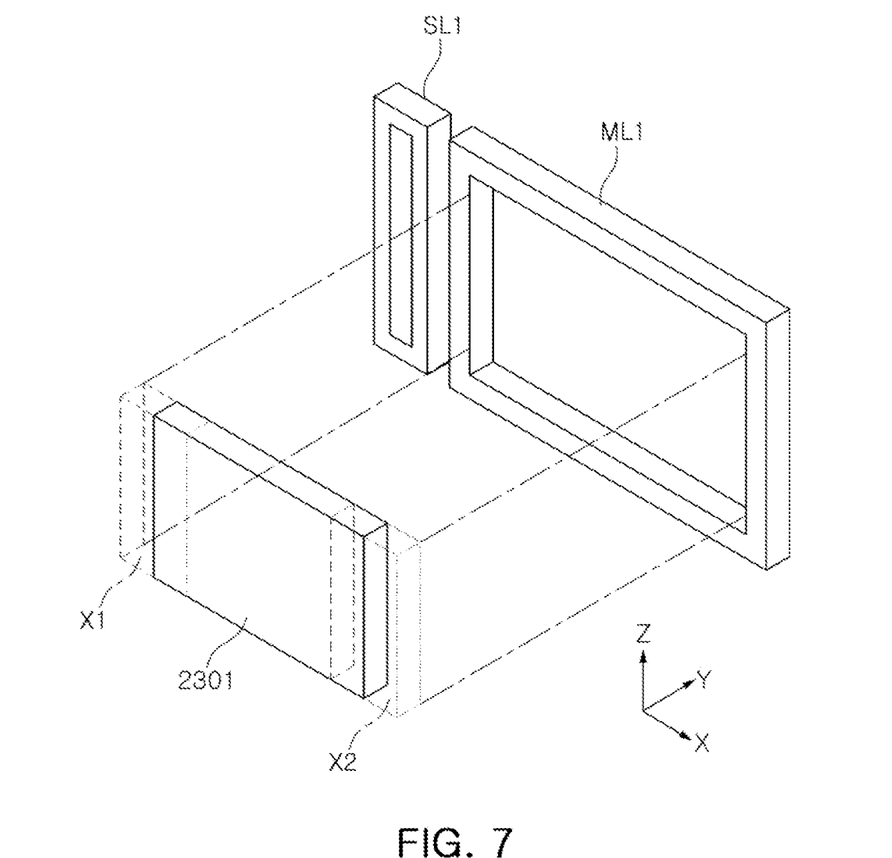

Referring to FIG. 7, the first main-sensing coil ML1 does not overlap the first detection target 2301, and the first sub-sensing coil SL1 also does not overlap the first detection target 2301. Therefore, the inductance of the first sub-sensing coil SL1 provided in order to remove the common noise due to the temperature, or the like, is limited from the movement of the first detection target 2301 in the Y-axis direction. In the present example, a driving coil is disposed in a hollow portion of the first main-sensing coil ML1, and the first sub-sensing coil SL1 is disposed outside of the first main-sensing coil ML1.

Referring to FIGS. 4 through 7, the first detection target 2301 may move along an X axis or a Y axis in the same direction as the moving direction of the lens barrel. When the first detection target 2301 moves along the Y axis, the first detection target 2301 moves in a direction perpendicular to a surface on which the first main-sensing coil ML1 and the first sub-sensing coil SL1 are disposed, and areas of overlap between the first detection target 2301 and the first main-sensing coil ML1 and the first sub-sensing coil SL1 may thus be constant. In addition, when the first detection target 2301 moves along the X axis, the first detection target 2301 is movable up to a position X1 and a position X2, and areas of overlap between the first detection target 2301, and the first main-sensing coil ML1 and the first sub-sensing coil SL1 may thus be maintained constant. Therefore, when the lens barrel moves in the X-axis direction, the changes in the inductances of the first main-sensing coil ML1 and the first sub-sensing coil SL1 are limited.

Figure 8:
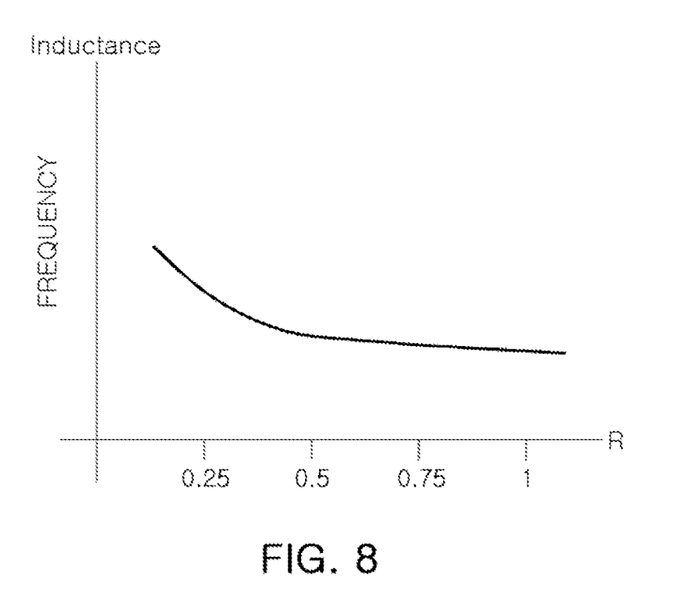
FIG. 8 is a graph illustrating an example of an inductance of a main-sensing coil.

FIG. 8 is a graph illustrating an example of an inductance of a main-sensing coil.

In FIG. 8, a horizontal axis, "R", indicates a ratio of a distance between a main-sensing coil and a detection target to a diameter of the main-sensing coil, and a vertical axis indicates an inductance of the main-sensing coil. Here, the distance between the main-sensing coil and the detection target refers to a distance between the main-sensing coil and the detection target when the detection target moves in a direction perpendicular to a surface on which the main-sensing coil is disposed.

Referring to FIG. 8, when the ratio, "R", of the distance between the main-sensing coil and the detection target to the diameter of the main-sensing coil is 0.5 or less, a change ratio in the inductance of the main-sensing coil is large, and a position of the detection target may thus be precisely detected. However, when the ratio, "R", of the distance between the main-sensing coil and the detection target to the diameter of the main-sensing coil exceeds 0.5, a change ratio in the inductance of the main-sensing coil becomes small, and a position of the detection target thus may not be as precisely detected.

In the illustrated examples of FIGS. 6 and 7, the diameter of the main-sensing coil is increased as compared to the illustrated examples of FIGS. 4 and 5, such that the detection target may be precisely detected even in the vicinity of a maximum distance between the main-sensing coil and the detection target.

Again referring to FIG. 3, since the changes in the inductances of the first main-sensing coil ML1 and the first sub-sensing coil SL1 are limited from the movement of the lens barrel in the X-axis direction as described above, the position of the lens barrel in the Y-axis direction is detected from the first main-oscillation signal SoscM1 and the first sub-oscillation signal SoscS1 output from the first main-oscillation circuit 241a and the first sub-oscillation circuit 241b, respectively. Likewise, since the changes in the inductances of the second main-sensing coil ML2 and the second sub-sensing coil SL2 are limited from the movement of the lens barrel in the Y-axis direction, the position of the lens barrel in the X-axis direction is detected from the second main-oscillation signal SoscM2 and the second sub-oscillation signal SoscS2 output from the second main-oscillation circuit 241c and the second sub-oscillation circuit 241d, respectively.

The computing unit 243 may compute the frequencies f_SoscM1, f_SoscS1, f_SoscM2, and f_SoscS2 of the first main-oscillation signal SoscM1, the first sub-oscillation signal SoscS1, the second main-oscillation signal SoscM2, and the second sub-oscillation signal SoscS2 generated by the first main-oscillation circuit 241a, the first sub-oscillation circuit 241b, the second main-oscillation circuit 241c, and the second sub-oscillation circuit 241d. As an example, the computing unit 243 may compute the frequencies f_SoscM1, f_SoscS1, f_SoscM2, and f_SoscS2 of the first main-oscillation signal SoscM1, the first sub-oscillation signal SoscS1, the second main-oscillation signal SoscM2, and the second sub-oscillation signal SoscS2 using reference clocks CLK. In detail, the computing unit 243 may count the oscillation signals using the reference clocks CLK, and may compute the frequencies using the number of counted reference clocks CLK and frequencies of the reference clocks CLK. As an example, the computing unit 243 may count oscillation signals during a reference section as the reference clocks CLK.

The detecting unit 245 may receive the frequencies f_SoscM1, f_SoscS1, f_SoscM2, and f_SoscS2 of the first main-oscillation signal SoscM1, the first sub-oscillation signal SoscS1, the second main-oscillation signal SoscM2, and the second sub-oscillation signal SoscS2 from the computing unit 243, and determine the positions of the lens barrel in the X-axis and Y-axis directions in response to the frequencies f_SoscM1, f_SoscS1, f_SoscM2, and f_SoscS2.

The detecting unit 245 is configured to calculate the position of the lens barrel in the Y-axis direction from a difference between a first main-frequency f_SoscM1 and a first sub-frequency f_SoscS1, and calculate the position of the lens barrel in the X-axis direction from a difference between a second main-frequency f_SoscM2 and a second sub-frequency f_SoscS2. According to the present examples, common noise is removed from the main frequency by subtracting the first sub-frequency f_SoscS1 from the first main-frequency f_SoscM1 or subtracting the second sub-frequency f_SoscS2 from the second main-frequency f_SoscM2, and sensing characteristics resistant to noise may thus be secured.

The detecting unit 245 may include a memory, and position information of the lens barrel corresponding to frequencies of oscillation signals is stored in the memory. The memory may be implemented by a non-volatile memory including one of a flash memory, an electrically erasable programmable read-only memory (EEPROM), and a ferroelectric random-access memory (FeRAM). The detecting unit 245 may determine the position of the lens barrel by comparing a computing result depending on the difference between the first main-frequency f_SoscM1 and the first sub-frequency f_SoscS1 and/or the difference between the second main-frequency f_SoscM2 and the second sub-frequency f_SoscS2 with the position information of the lens barrel stored in the memory.

Meanwhile, referring to FIGS. 5 and 7, the first sub-sensing coil SL1 is disposed so as not to overlap the first detection target 2301, and the second sub-sensing coil SL2 of FIG. 3 disposed similarly to the first sub-sensing coil SL1 may also be disposed so as not to overlap the second detection target 2302 facing the second sub-sensing coil SL2.

In the examples disclosed herein, the first sub-sensing coil SL1 and the second sub-sensing coil SL2 may be integrated with each other as a single integrated sub-sensing coil to reduce manufacturing costs of the actuator of a camera module. As an example, the integrated sub-sensing coil is disposed at one side of one of the first main-sensing coil ML1 and the second main-sensing coil ML2 in a region in which it does not overlap the detection target. As another example, the integrated sub-sensing coil is disposed in a corner region of the lens barrel between the first main-sensing coil ML1 and the second main-sensing coil ML2. Therefore, an inductance of the integrated sub-sensing coil provided in order to remove the common noise due to the temperature, or the like, is limited from interfering with detection of movement of the detection target in the X-axis and Y-axis directions.

As set forth above, the actuator of a camera module in the examples disclosed herein may precisely detect the position of the lens barrel from the changes in the inductances of the sensing coils. Further, the actuator of a camera module does not use a separate hall sensor, such that manufacturing costs of the actuator of a camera module may be reduced and space efficiency of the actuator of a camera module may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator, comprising:
   a detection target disposed on a surface of a lens barrel; and
   a position detecting unit comprising two or more sensing coils and configured to detect a displacement of the detection target in a first direction perpendicular to an optical axis,
   wherein when the detection target moves in a second direction perpendicular to the optical axis, an area of overlap between each of the two or more sensing coils and the detection target is maintained constant.

2. The actuator of claim 1, wherein the first direction corresponds to a direction perpendicular to a surface on which the two or more sensing coils are disposed.

3. The actuator of claim 1, wherein the second direction corresponds to a direction parallel with a surface on which the two or more sensing coils are disposed.

4. The actuator of claim 1, wherein the two or more sensing coils comprise a main-sensing coil and a sub-sensing coil.

5. The actuator of claim 4, wherein an inductance of the main-sensing coil is greater than that of the sub-sensing coil.

6. The actuator of claim 5, wherein the main-sensing coil and the sub-sensing coil are disposed to face the detection target.

7. The actuator of claim 5, wherein a range in which the detection target is movable in the second direction is positioned to overlap in a hollow portion of the main-sensing coil, and the sub-sensing coil is disposed inside the hollow portion of the main-sensing coil.

8. The actuator of claim 4, wherein the main-sensing coil is disposed to face the detection target, and the sub-sensing coil is disposed outside a range in which the detection target is movable in the second direction.

9. The actuator of claim 4, wherein a range in which the detection target is movable in the second direction is positioned to overlap in a hollow portion of the main-sensing coil, and the sub-sensing coil is disposed outside of the hollow portion of the main-sensing coil.

10. An actuator, comprising:
    a detection target disposed on a surface of a lens barrel;
    an oscillating unit comprising two or more oscillation circuits, each of the two or more oscillation circuits comprising a sensing coil; and
    a detecting unit configured to calculate a position of the detection target in a first direction perpendicular to an optical axis in response to a difference between frequencies of two or more oscillation signals output from the two or more oscillation circuits, respectively,
    wherein when the detection target moves in a second direction perpendicular to the optical axis, the frequencies of the two or more oscillation signals are maintained constant.

11. The actuator of claim 10, wherein the two or more sensing coils comprise a main-sensing coil and a sub-sensing coil, and
    when the detection target moves in the second direction, an area of overlap between each of the main-sensing coil and the sub-sensing coil and the detection target is maintained constant.

12. The actuator of claim 11, wherein an inductance of the main-sensing coil is greater than that of the sub-sensing coil.

13. The actuator of claim 12, wherein the main-sensing coil and the sub-sensing coil are disposed to face the detection target.

14. The actuator of claim 12, wherein a range in which the detection target is movable in the second direction is positioned to overlap in a hollow portion of the main-sensing coil, and the sub-sensing coil is disposed inside the hollow portion of the main-sensing coil.

15. The actuator of claim 11, wherein the main-sensing coil is disposed to face the detection target, and the sub-sensing coil is disposed outside a range in which the detection target is movable in the second direction.

16. The actuator of claim 11, wherein a range in which the detection target is movable in the second direction is positioned to overlap in a hollow portion of the main-sensing coil, and the sub-sensing coil is disposed outside of the hollow portion of the main-sensing coil.

17. An actuator, comprising:
    a first detection target disposed on a lateral surface of a body and a second detection target disposed on an other surface of the body; and
    a detecting unit comprising two or more first sensing coils configured to detect a displacement of the first detection target perpendicular to the lateral surface and two or more second sensing coils configured to detect a displacement of the second detection target perpendicular to the other surface, wherein overlap area of the first detection target with the first sensing coils remains constant when the body moves perpendicular to the lateral surface and overlap area of the second detection target with the second sensing coils remains constant when the body moves perpendicular to the other surface.

18. The actuator of claim 17, wherein the body comprises a lens barrel comprising an optical axis parallel to the lateral surface and the other surface.

19. The actuator of claim 17, wherein the two or more first sensing coils comprise coils of different inductances, and
wherein the two or more second sensing coils comprise coils of different inductances.

20. The actuator of claim 17, further comprising a computing unit configured to receive oscillation signals from circuits comprising the first and second sensing coils, and to output a frequency corresponding to each received signal,
wherein the detecting unit is further configured to calculate a position of the body in a direction perpendicular to the lateral surface in response to a difference between frequencies corresponding to the two or more first sensing coils, and in a direction perpendicular to the other surface in response to a difference between frequencies corresponding to the two or more second sensing coils.

* * * * *